(12) United States Patent
Olives et al.

(10) Patent No.: US 8,781,881 B2
(45) Date of Patent: Jul. 15, 2014

(54) MERCHANT BENCHMARKING TOOL

(75) Inventors: Jeffrey Rolland Olives, Danville, CA (US); Jay Allen DeWitt, Spokane, WA (US); Dennis Norman Moser, Atherton, CA (US); James C. Salters, Cincinnati, OH (US); Laura DiGioacchino, San Mateo, CA (US); Alex Epelman, Redwood City, CA (US)

(73) Assignee: Visa U.S.A. Inc., San Francisco, CA (US)

( * ) Notice: Subject to any disclaimer, the term of this patent is extended or adjusted under 35 U.S.C. 154(b) by 1121 days.

(21) Appl. No.: 12/191,796

(22) Filed: Aug. 14, 2008

(65) Prior Publication Data

US 2009/0048884 A1 Feb. 19, 2009

Related U.S. Application Data

(60) Provisional application No. 60/955,856, filed on Aug. 14, 2007.

(51) Int. Cl.
*G06Q 10/00* (2012.01)

(52) U.S. Cl.
USPC .......................................... 705/7.38; 705/7.36

(58) Field of Classification Search
USPC ............................... 705/7.36, 7.38
See application file for complete search history.

(56) References Cited

U.S. PATENT DOCUMENTS

| | | | |
|---|---|---|---|
| 6,154,729 A * | 11/2000 | Cannon et al. | 705/35 |
| 6,334,110 B1 | 12/2001 | Walter et al. | |
| 6,363,363 B1 * | 3/2002 | Haller et al. | 705/40 |
| 6,968,316 B1 | 11/2005 | Hamilton | |
| 7,117,172 B1 * | 10/2006 | Black | 705/35 |
| 7,165,037 B2 * | 1/2007 | Lazarus et al. | 705/7.31 |
| 7,668,832 B2 | 2/2010 | Yeh et al. | |
| 7,996,521 B2 | 8/2011 | Chamberlain et al. | |
| 8,055,548 B2 * | 11/2011 | Staib et al. | 705/26.1 |
| 8,175,908 B1 * | 5/2012 | Anderson | 705/7.29 |
| 8,195,500 B2 | 6/2012 | Tavares et al. | |
| 8,224,687 B2 | 7/2012 | Tavares et al. | |
| 8,306,846 B2 | 11/2012 | Tavares et al. | |

(Continued)

FOREIGN PATENT DOCUMENTS

| | | |
|---|---|---|
| WO | 0068861 | 11/2000 |
| WO | 2004038623 A2 | 5/2004 |
| WO | 2008067543 A2 | 6/2008 |

OTHER PUBLICATIONS

[PDF] College student credit card usage [PDF] from msb.edu ME Staten . . . —Credit Research Center, Working Paper, 2002—faculty. msb.edu.*

(Continued)

*Primary Examiner* — Jonathan G Sterrett
(74) *Attorney, Agent, or Firm* — Loeb & Loeb LLP

(57) ABSTRACT

A benchmarking tool generates reports for delivery to a merchant illustrating a performance of the merchant as compared to the performance of the merchant's peers. The performance is illustrated through metrics that algorithmically combine data on transactions of consumers with the merchant or its peers, respectively. The metrics may be further subdivided into consumer groups such as new consumers, consumers that have shopped within the merchant in the past, consumers that no longer shop within the merchant, or consumers that use a commercial account to pay for purchases. The reports may be rendered in a graphical display for use by the merchant.

16 Claims, 12 Drawing Sheets

(56) References Cited

U.S. PATENT DOCUMENTS

| | | | |
|---|---|---|---|
| 2002/0007302 A1* | 1/2002 | Work et al. | 705/10 |
| 2002/0026348 A1* | 2/2002 | Fowler et al. | 705/10 |
| 2002/0029290 A1* | 3/2002 | Burema et al. | 709/238 |
| 2002/0082920 A1* | 6/2002 | Austin et al. | 705/14 |
| 2003/0061132 A1 | 3/2003 | Yu, Sr. et al. | |
| 2003/0088460 A1 | 5/2003 | Riordan et al. | |
| 2003/0126075 A1* | 7/2003 | Mascavage et al. | 705/39 |
| 2004/0230472 A1 | 11/2004 | Venkat et al. | |
| 2005/0021492 A1 | 1/2005 | Safaei et al. | |
| 2005/0055275 A1 | 3/2005 | Newman et al. | |
| 2005/0159996 A1 | 7/2005 | Lazarus et al. | |
| 2005/0197954 A1 | 9/2005 | Maitland et al. | |
| 2006/0020542 A1* | 1/2006 | Litle et al. | 705/40 |
| 2006/0155598 A1 | 7/2006 | Spurr et al. | |
| 2006/0282432 A1 | 12/2006 | Cassidy et al. | |
| 2007/0055482 A1 | 3/2007 | Goodermote et al. | |
| 2007/0100728 A1 | 5/2007 | Rotman et al. | |
| 2007/0235525 A1* | 10/2007 | Murch | 235/382 |
| 2008/0270246 A1* | 10/2008 | Chen | 705/17 |
| 2008/0300973 A1* | 12/2008 | DeWitt et al. | 705/14 |
| 2009/0006203 A1* | 1/2009 | Fordyce et al. | 705/14 |
| 2009/0198557 A1 | 8/2009 | Wang et al. | |
| 2009/0234710 A1 | 9/2009 | Belgaied Hassine et al. | |
| 2009/0234715 A1 | 9/2009 | Heiser, II et al. | |
| 2010/0070376 A1 | 3/2010 | Proud et al. | |
| 2010/0076812 A1 | 3/2010 | Gosh et al. | |
| 2010/0161379 A1 | 6/2010 | Bene et al. | |
| 2010/0323632 A1 | 12/2010 | Okino | |
| 2011/0035280 A1 | 2/2011 | Fordyce, III et al. | |
| 2011/0251907 A1 | 10/2011 | Tavares et al. | |
| 2012/0278177 A1 | 11/2012 | Bender et al. | |
| 2012/0323632 A1 | 12/2012 | Bender et al. | |

OTHER PUBLICATIONS

On nonexclusive membership in competing joint ventures [PDF] from jstor.orgJA Hausman, GK Leonard . . . —Rand Journal of Economics, 2003—JSTOR.*

An Empirical Analysis of Payment Card Usage [PDF] from psu.edu M Rysman—The Journal of Industrial Economics, 2007—Wiley Online Library.*

Money attitudes, credit card use, and compulsive buying among American college students JA Roberts . . . —Journal of Consumer Affairs, 2001—Wiley Online Library.*

Applications of data mining in retail business SR Ahmed—. . . Coding and Computing, 2004. Proceedings. ITCC . . . , 2004—ieeexplore.ieee.org.*

An integrated data mining and behavioral scoring model for analyzing bank customers [PDF] from ncu.edu.tw NC Hsieh—Expert Systems with Applications, 2004—Elsevier.*

"Credit card processing: a look inside the black box", R DeGennaro—Economic Review, 2006—papers.ssrn.com.*

Payment method negotiation service A Bahreman, R Narayanaswamy—The Second USENIX Workshop . . . , 1996—static.usenix.org.*

How BPEL and SOA are changing Web services development J Pasley—Internet Computing, IEEE, 2005—ieeexplore.ieee.org.*

"Payment Application Programmers Interface (API) for v1. 0 Internet Open Trading Protocol (IOTP)", H Beykirch, A Origin—2004—nchu.edu.tw.*

Using digital signatures as evidence of authorizations in electronic credit-card payments E Van Herreweghen—1999—Citeseer.*

AIM Architecture for Financial Services G Van de Putte, M Ghiotti, R Knaus . . . —IBM Redbooks, http:// . . . , 2002—redbooks.ibm.com.*

Open Financial Exchange, Specification 2.1.1, May 1, 2006, copyright Intuit, Microsoft Corp., Checkfree Corp., pp. 1-665.*

Semper Consortium, Architecture of Payment Gateway, Deliverable D14 of ACTS Project ACO26, Public Report, Nov. 22, 1996, pp. 1-23.*

"Reflections on gaining competitive advantage through customer value", A Parasuraman—Journal of the academy of marketing science, 1997—Springer.*

An application of support vector machines for customer churn analysis: Credit card case S Kim, K Shin, K Park—Advances in Natural Computation, 2005—Springer.*

Business data mining—a machine learning perspective I Bose, RK Mahapatra—Information & management, 2001—Elsevier.*

PCT International Search Report and Written Opinion, mailed Mar. 5, 2009 for PCT/US2008/073210, filed Aug. 14, 2008.

PCT International Preliminary Report on Patentability, issued Feb. 16, 2010, for PCT/US2008/073210, filed Aug. 14, 2008.

Supplementary European Search Report and European Search Opinion, dated May 25, 2012, for EP Application No. 08797921.7, filed Aug. 14, 2008.

* cited by examiner

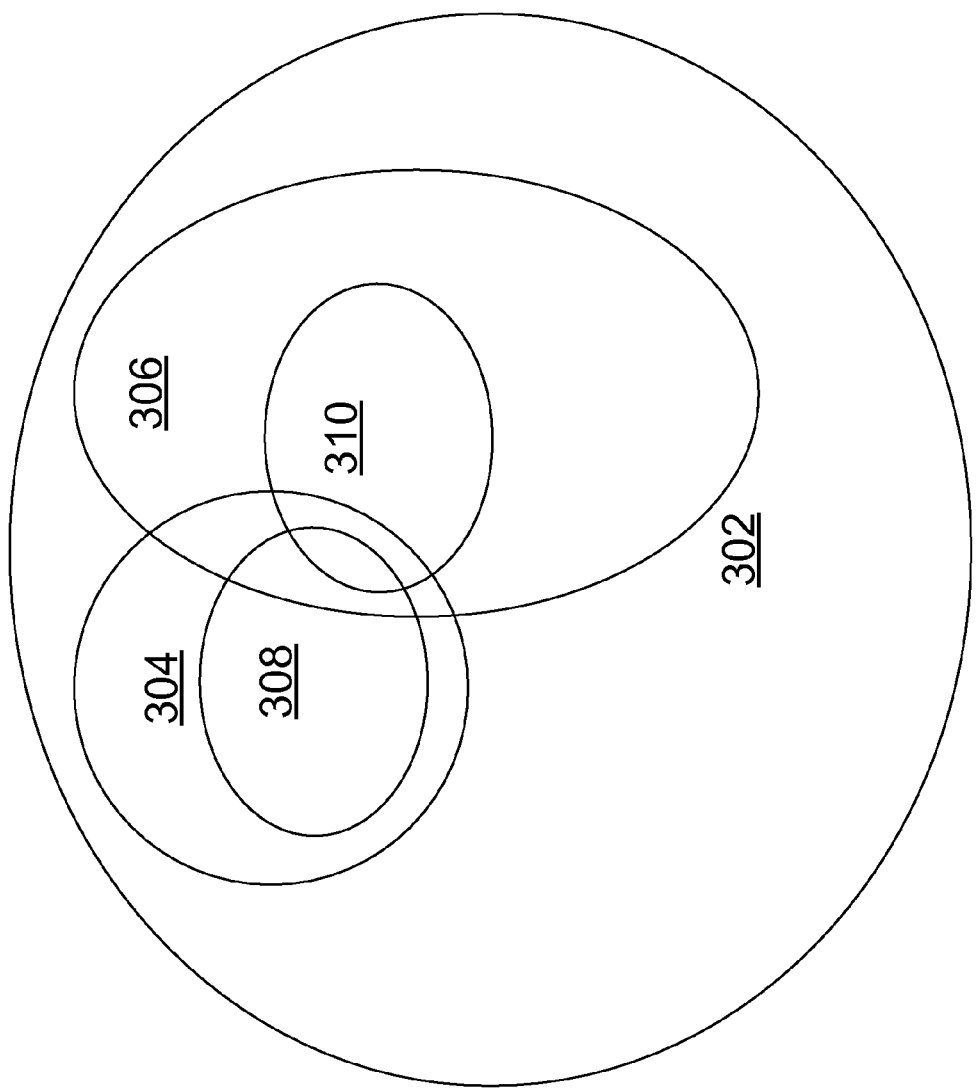

Overall Sales and Marketing Performance Report
*Summary of total sales growth, market share, and sales to New and Existing Customers* ~400

Total Sales Growth ~402
*Sequential and year-over-year monthly sales growth among all customers: new and existing*

| MONTHLY SALES GROWTH-THIS MONTH | | |
|---|---|---|
| | SEQ. | YoY |
| MERCHANT | 5.9% | 4.9% |
| PEERS | 3.9% | 6.1% |

~408  ~410

| SEQUENTIAL MONTHLY SALES GROWTH – TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 5.9% | 3.6% | 4.9% | 6.9% | 1.3% | -3.1% | -1.4% | 6.5% | 3.6% | 4.6% | 7.1% | 5.9% | 1.3% |
| PEERS | 3.9% | 3.2% | 3.0% | 3.6% | 2.1% | 1.6% | 2.5% | 6.0% | 5.7% | 4.2% | 4.6% | 3.9% | 2.1% |

Total Customer Count Growth ~404
*Sequential and year-over-year monthly customer count growth among all customers: new and existing*

~412 ~414

| CUSTOMER COUNT GROWTH-THIS MONTH | | |
|---|---|---|
| | SEQ. | YoY |
| MERCHANT | 5.9% | 4.9% |
| PEERS | 3.9% | 6.1% |

| SEQUENTIAL CUSTOMER COUNT GROWTH – TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 5.9% | 3.6% | 4.9% | 6.9% | 1.3% | -3.1% | -1.4% | 6.5% | 3.6% | 4.6% | 7.1% | 5.9% | 1.3% |
| PEERS | 3.9% | 3.2% | 3.0% | 3.6% | 2.1% | 1.6% | 2.5% | 6.0% | 5.7% | 4.2% | 4.6% | 3.9% | 2.1% |

Existing Customer Sales Growth ~406
*Sequential and year-over-year monthly sales growth among Existing Customers*

| MONTHLY SALES GROWTH-THIS MONTH | | |
|---|---|---|
| | SEQ. | YoY |
| MERCHANT | 11.3% | 4.9% |
| PEERS | 11.1% | 6.1% |

FIG. 4

New Customer Sales Growth ~ 502
*Sequential and year-over-year monthly sales growth among New Customers*

| MONTHLY SALES GROWTH-THIS MONTH | SEQ. | YoY |
|---|---|---|
| MERCHANT | 10.3% | 14.9% |
| PEERS | 11.1% | 12.1% |

| SEQUENTIAL MONTHLY SALES GROWTH - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 10.3% | 9.2% | 6.5% | 3.8% | 4.6% | 7.1% | 5.9% | 3.6% | 4.9% | 6.9% | 1.3% | -3.1% | -1.4% |
| PEERS | 11.1% | 8.0% | 6.0% | 5.7% | 4.2% | 4.6% | 3.9% | 3.2% | 3.0% | 3.6% | 2.1% | 1.6% | 2.5% |

Peer Group Market Share ~ 504
*Merchant's share of peer group spending among three categories of customers: All customers in the peer group, customers who have prior purchases from the peer group, and customers who are new to the peer group*

| MARKET SHARE AT PERCENTAGE OF CUSTOMER SPENDING IN PEER GROUP ($) - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| 510 ALL CUSTOMERS | 66% | 59% | 61% | 66% | 59% | 61% | 66% | 59% | 61% | 66% | 59% | 61% | 59% |
| 512 EXISTING TO PEERS | 64% | 62% | 59% | 64% | 62% | 59% | 64% | 62% | 59% | 64% | 62% | 59% | 62% |
| 514 NEW TO PEERS | 37% | 32% | 29% | 31% | 29% | 27% | 28% | 25% | 26% | 23% | 19% | 21% | 20% |

Relative Share Of Sales: Existing vs. New Customers ~ 506
*Percentage of merchant sales to existing customers (remaining percentage are sales to new customers)*

| RELATIVE SHARE OF SALES: EXISTING CUSTOMERS - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 64% | 62% | 59% | 64% | 62% | 59% | 64% | 62% | 59% | 64% | 62% | 59% | 62% |
| PEERS | 66% | 59% | 61% | 66% | 59% | 61% | 66% | 59% | 61% | 66% | 59% | 61% | 59% |

Relative Share of Sales: Consumer vs. Commercial Customers ~ 508
*Percentage of merchant sales to customers (remaining percentage are sales to commercial customers)*

| RELATIVE SHARE OF SALES: EXISTING CUSTOMERS - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 64% | 62% | 59% | 64% | 62% | 59% | 64% | 62% | 59% | 64% | 62% | 59% | 62% |
| PEERS | 66% | 59% | 61% | 66% | 59% | 61% | 66% | 59% | 61% | 66% | 59% | 61% | 59% |

FIG. 5

Existing Customer Report — 600
*Existing Customers have at least one purchase in the prior 12 months*

Existing Customer Sales Growth
*Sequential and year-over-year monthly sales growth among Existing Customers*

| MONTHLY SALES GROWTH-THIS MONTH | SEQ. | YoY |
|---|---|---|
| MERCHANT | 11.3% | 4.9% |
| PEERS | 11.1% | 6.1% |

| SEQUENTIAL MONTHLY SALES GROWTH – TRAILING 13 MONTHS ||||||||||||||
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 11.1% | 9.2% | 6.5% | 3.8% | 4.6% | 7.1% | 5.9% | 3.0% | 3.6% | 3.5% | 1.3% | -3.1% | -1.4% |
| PEERS | 11.1% | 8.0% | 6.0% | 5.7% | 4.2% | 4.6% | 3.9% | 3.2% | 3.0% | 3.6% | 2.1% | 1.6% | 2.5% |

Drive Larger Average Tickets — 602
*Sequential and year-over-year change in average ticket among Existing Customers who purchased this month*

| CHANGE IN AVERAGE TICKET-THIS MONTH | SEQ. | YoY |
|---|---|---|
| MERCHANT | -1.0% | -2.2% |
| PEERS | 6.1% | 1.5% |

| AVERAGE TICKET – TRAILING 13 MONTHS ||||||||||||||
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | $53.10 | $53.65 | $52.76 | $43.30 | $43.93 | $52.59 | $51.94 | $51.43 | $52.25 | $50.94 | $52.29 | $53.32 | $50.97 |
| PEERS | $53.50 | $53.32 | $53.50 | $50.94 | $50.22 | $51.13 | $49.92 | $53.42 | $52.11 | $52.59 | $51.94 | $52.20 | $50.38 |

Increase Purchase Frequency — 604
*Average number of purchases in prior 12 months of Top 25% most frequent, and next 25% most frequent (whether they purchase this month or not)*

| AVG # PURCHASES IN PRIOR 12 MONTHS – TRAILING 13 MONTHS |||||||||||||||
|---|---|---|---|---|---|---|---|---|---|---|---|---|---|---|
| | CUSTOMERS | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | TOP 10% | 4.6 | 4.6 | 4.6 | 4.7 | 4.6 | 4.6 | 4.5 | 4.6 | 4.4 | 4.5 | 4.3 | 4.4 | 4.4 |
| | TOP 30% | 3.3 | 3.3 | 3.2 | 3.3 | 3.4 | 3.4 | 3.4 | 3.2 | 3.5 | 3.3 | 3.6 | 3.4 | 3.4 |
| PEERS | TOP 10% | 4.1 | 4.2 | 4.3 | 4.3 | 4.4 | 4.3 | 4.3 | 4.3 | 4.5 | 4.2 | 4.4 | 4.2 | 4.3 |
| | TOP 30% | 3.1 | 3.2 | 3.3 | 3.3 | 3.2 | 3.3 | 3.3 | 3.4 | 3.2 | 3.1 | 3.1 | 3.0 | 3.2 |

FIG. 6

Increase Recency — 702

*Percent of Existing Customers who have made purchases in the time periods shown (since last purchase)*

RECENCY - TRAILING 13 MONTHS

| | RECENCY | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
|---|---|---|---|---|---|---|---|---|---|---|---|---|---|---|
| MERCHANT | THIS MONTH | 11% | 10% | 8% | 10% | 11% | 12% | 11% | 10% | 9% | 8% | 9% | 8% | 11% |
| | 1 MO AGO | 14% | 12% | 15% | 13% | 14% | 15% | 13% | 11% | 13% | 15% | 16% | 15% | 14% |
| | 2 MO AGO | 11% | 10% | 16% | 10% | 11% | 12% | 13% | 10% | 9% | 8% | 9% | 8% | 11% |
| | 3 MO AGO | 13% | 14% | 11% | 13% | 14% | 15% | 13% | 11% | 13% | 15% | 16% | 15% | 14% |
| | 4+ MO AGO | 51% | 54% | 50% | 54% | 50% | 46% | 52% | 58% | 56% | 54% | 50% | 54% | 50% |
| PEERS | THIS MONTH | 13% | 12% | 11% | 12% | 13% | 14% | 13% | 10% | 9% | 7% | 6% | 7% | 5% |
| | 1 MO AGO | 12% | 13% | 15% | 14% | 13% | 12% | 11% | 14% | 13% | 11% | 12% | 14% | 12% |
| | 2 MO AGO | 15% | 15% | 17% | 13% | 16% | 14% | 13% | 10% | 15% | 16% | 17% | 18% | 16% |
| | 3 MO AGO | 17% | 15% | 17% | 14% | 18% | 16% | 15% | 17% | 18% | 14% | 15% | 16% | 13% |
| | 4+ MO AGO | 43% | 45% | 46% | 47% | 40% | 44% | 48% | 49% | 45% | 52% | 50% | 45% | 54% |

Increase Wallet Share vs. Competitors — 704

*Percent of Existing Customers who fall into loyalty bands indicating percentage customer spend with the merchant vs. the peer group*

CUSTOMER SPENDING LOYALTY - TRAILING 13 MONTHS

| | CUSTOMERS | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
|---|---|---|---|---|---|---|---|---|---|---|---|---|---|---|
| MERCHANT | TOP 10% | 79% | 77% | 75% | 74% | 76% | 75% | 76% | 73% | 74% | 72% | 74% | 73% | 71% |
| | TOP 30% | 58% | 52% | 51% | 53% | 54% | 55% | 54% | 55% | 56% | 56% | 57% | 55% | 58% |
| PEERS | TOP 10% | 76% | 73% | 74% | 75% | 73% | 72% | 75% | 75% | 77% | 76% | 76% | 76% | 75% |
| | TOP 20% | 51% | 54% | 50% | 54% | 50% | 46% | 52% | 58% | 56% | 54% | 50% | 54% | 50% |

FIG. 7

Increase Customer Total Spend — 802

*Total Existing Customer spending with merchant over 12 month period*

12-MONTH TOTAL SPENDING PER CUSTOMER - TRAILING 13 MONTHS

| | BANDS | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
|---|---|---|---|---|---|---|---|---|---|---|---|---|---|---|
| MERCHANT | TOP 10% | $158.33 | $144.56 | $146.31 | $139.57 | $142.24 | $141.82 | $139.47 | $140.91 | $139.22 | $136.48 | $124.48 | $137.34 | $143.12 |
| | TOP 30% | $153.61 | $139.84 | $141.59 | $135.85 | $137.52 | $137.10 | $133.75 | $136.19 | $134.50 | $131.76 | $119.76 | $132.62 | $138.40 |
| PEERS | TOP 10% | $159.25 | $153.70 | $151.29 | $154.98 | $150.83 | $153.28 | $149.37 | $137.87 | $126.01 | $119.23 | $125.32 | $120.08 | $125.23 |
| | TOP 30% | $148.06 | $142.59 | $140.10 | $143.79 | $139.64 | $142.09 | $138.18 | $126.68 | $114.82 | $108.04 | $114.13 | $108.89 | $114.04 |

Increase Retention Rate — 804

*Percentage of all Existing Customers who were also Existing Customers in the prior month*

RETENTION RATE - TRAILING 13 MONTHS

| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
|---|---|---|---|---|---|---|---|---|---|---|---|---|---|
| MERCHANT | 88% | 86% | 85% | 87% | 86% | 83% | 84% | 81% | 82% | 79% | 77% | 81% | 79% |
| PEERS | 87% | 86% | 86% | 84% | 85% | 82% | 82% | 82% | 81% | 82% | 83% | 81% | 80% |

Reduce Lost Customers to Competitors

*Percentage of new Lost Customers who are Existing Customers with a competitor (Lost to Competitors)*

% OF LOST CUSTOMERS TO COMPETITORS - TRAILING 13 MONTHS

| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
|---|---|---|---|---|---|---|---|---|---|---|---|---|---|
| MERCHANT | 66% | 58% | 62% | 60% | 61% | 63% | 62% | 65% | 62% | 64% | 61% | 59% | 63% |
| PEERS | 70% | 60% | 59% | 57% | 59% | 60% | 61% | 63% | 62% | 64% | 60% | 59% | 57% |

FIG. 8

NEW CUSTOMER REPORT
*New Customers made a purchase in the current period and have no prior purchases in the Existing Customer period*

New Customer Sales Growth
*Sequential and year-over-year monthly sales growth among New Customers*

| MONTHLY SALES GROWTH-THIS MONTH | SEQ. | YoY |
|---|---|---|
| MERCHANT | 10.3% | 14.9% |
| PEERS | 11.1% | 12.1% |

| SEQUENTIAL MONTHLY SALES GROWTH - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 10.3% | 9.2% | 6.5% | 3.8% | 4.6% | 7.1% | 5.9% | 3.6% | 4.9% | 6.9% | 1.3% | -3.1% | -1.4% |
| PEERS | 11.1% | 8.0% | 6.0% | 5.7% | 4.2% | 4.6% | 3.9% | 3.2% | 3.0% | 3.6% | 2.1% | 1.6% | 2.5% |

New Customer Count Growth —902
*Sequential and year-over-year growth in number of New Customers*

| MONTHLY SALES GROWTH-THIS MONTH | SEQ. | YoY |
|---|---|---|
| MERCHANT | 10.3% | 14.9% |
| PEERS | 11.1% | 12.1% |

| SEQUENTIAL CUSTOMER COUNT GROWTH - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 10.3% | 9.2% | 6.5% | 3.8% | 4.6% | 7.1% | 5.9% | 3.6% | 4.9% | 6.9% | 1.3% | -3.1% | -1.4% |
| PEERS | 11.1% | 8.0% | 6.0% | 5.7% | 4.2% | 4.6% | 3.9% | 3.2% | 3.0% | 3.6% | 2.1% | 1.6% | 2.5% |

FIG. 9

Drive Larger Average Tickets

*Sequential and year-over-year change in average ticket among New Customers*

| CHANGE IN AVERAGE TICKET-THIS MONTH | SEQ. | YoY |
|---|---|---|
| MERCHANT | 0.81% | 9.27% |
| PEERS | 0.34% | 6.19% |

| AVERAGE TICKET - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | $54.55 | $54.11 | $50.33 | $53.32 | $52.11 | $52.59 | $51.94 | $51.43 | $52.25 | $50.94 | $50.22 | $51.23 | $49.92 |
| PEERS | $53.50 | $53.32 | $53.50 | $50.94 | $50.22 | $51.13 | $49.92 | $53.32 | $52.11 | $52.59 | $51.94 | $52.20 | $50.38 |

Attract Competitors' Customers/Attract New Customers to the Category ~1002

*Percentage of New Customers this month who are Existing Customers with at least one peer group competitor*
*Remainder of New Customers are new to the category, and are making first purchase from peer group merchants in at least 12 months*

| % OF CUSTOMERS WHO ARE EXISTING CUSTOMERS WITH COMPETITORS - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 28% | 30% | 36% | 35% | 31% | 31% | 34% | 39% | 42% | 41% | 43% | 44% | 43% |
| PEERS | 31% | 32% | 31% | 33% | 34% | 32% | 35% | 33% | 36% | 35% | 38% | 40% | 41% |

Convert New Customers into Repeat Customers ~1004

*In each reporting period, percentage of all New Customers over the prior 12 months who have made a second purchase within the prior 12 months*

| ALL NEW CUSTOMERS IN PRIOR 12 MONTHS WITH SECOND PURCHASE - TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 33% | 32% | 29% | 32% | 34% | 31% | 36% | 34% | 35% | 37% | 39% | 37% | 40% |
| PEERS | 41% | 39% | 38% | 36% | 38% | 39% | 39% | 35% | 34% | 32% | 33% | 36% | 37% |

*In each reporting period, percentage of all New Customers over the prior 12 months who have made a purchase in a month after their first purchase*

| NEW CUSTOMERS IN PRIOR 12 MONTHS WITH PURCHASE AFTER FIRST MONTH- TRAILING 13 MONTHS | | | | | | | | | | | | | |
|---|---|---|---|---|---|---|---|---|---|---|---|---|---|
| | FEB-07 | JAN-07 | DEC-06 | NOV-06 | OCT-06 | SEP-06 | AUG-06 | JUL-06 | JUN-06 | MAY-06 | APR-06 | MAR-06 | FEB-06 |
| MERCHANT | 28% | 30% | 36% | 35% | 32% | 31% | 34% | 39% | 42% | 41% | 43% | 44% | 43% |
| PEERS | 31% | 32% | 31% | 33% | 34% | 32% | 35% | 33% | 36% | 35% | 38% | 40% | 41% |

FIG. 10

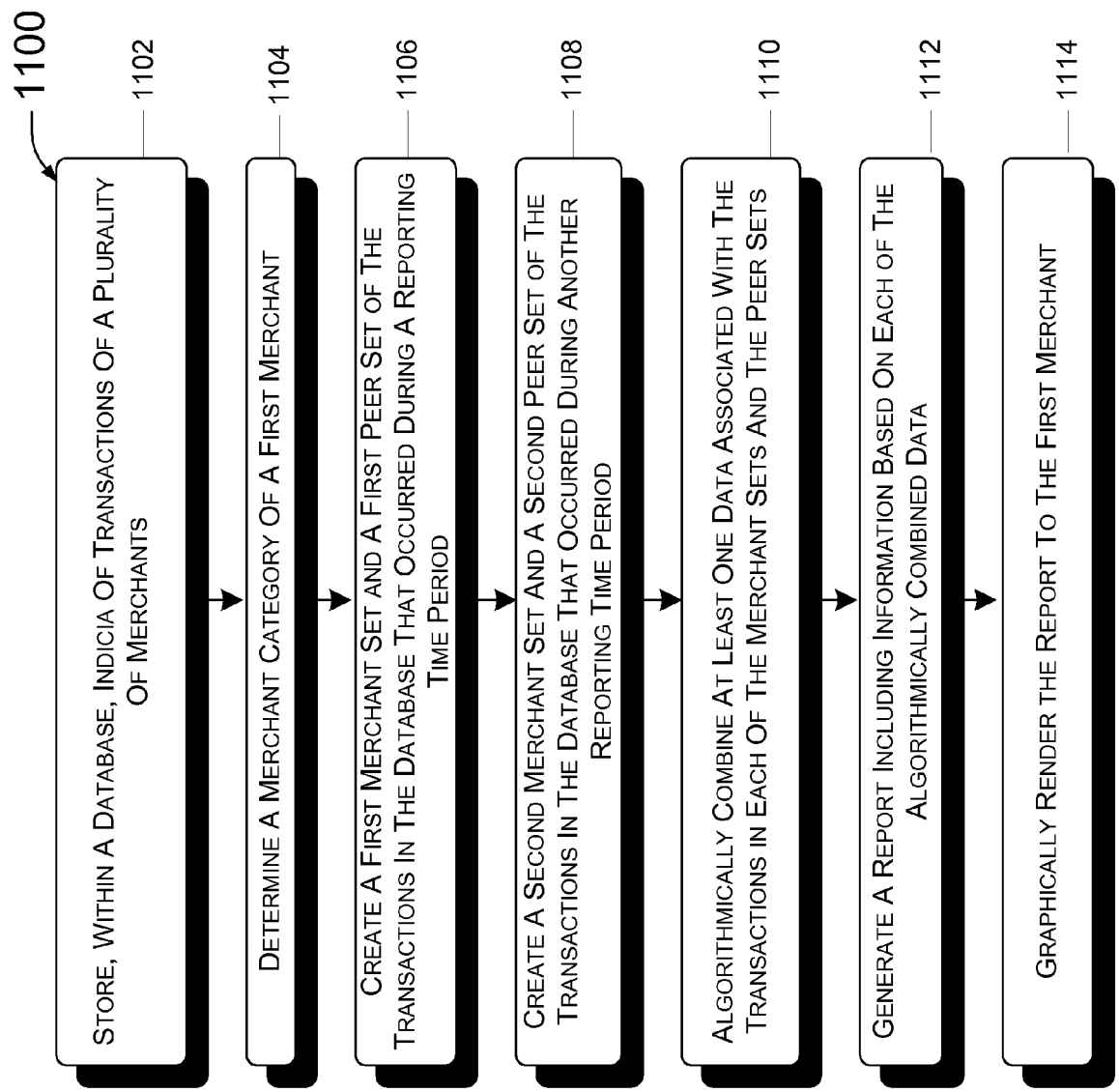

MERCHANT BENCHMARKING TOOL

CROSS-REFERENCES TO RELATED APPLICATIONS

This non-provisional application claims priority to, and the benefit of, U.S. application Ser. No. 60/955,856, filed Aug. 14, 2007, entitled "Merchant Benchmarking Tool", the entire contents of which is hereby incorporated by reference.

FIELD

Various implementations, and combinations thereof, are related to data analysis tools, more particularly data analysis tools useful in the payment processing industry, and most particularly to data analysis tools that compares a sales performance of a merchant to that of peers of the merchant.

COPYRIGHT

Contained herein are materials subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND

A merchant, such as a retailer, may collect point of sale information on transactions conducted between the merchant and consumers purchasing goods or services of the merchant. The point of sale information may assist the merchant to determine the amount of sales that the merchant may have had during a time interval. The point of sale information may reveal to the merchant that some goods or services are more frequently sold than others.

However, it may be difficult for the merchant to quantitatively evaluate how sales of the merchant compare to the sales of peers of the merchant. Generally, the merchant does not have access to purchasing histories or purchasing trends of consumers across multiple merchants within a market in which the merchant is a member. Moreover, such purchasing histories or purchasing trends may not be organized in a way for the merchant to be able to evaluate their relevance to a consumer base of the merchant. Organized information about sales within the market of the merchant may assist the merchant in evaluating its marketing and payment programs, such as targeted marketing programs, loyalty programs, store/site design, merchandising and category management, pricing, or other such promotions of the merchant.

The foregoing points out a need to provide performance measures of sales of the merchant.

SUMMARY

In one implementation, a computer implemented method is disclosed wherein data is accumulated from a plurality of cashless sales transactions each of which is conducted on a corresponding account issued to a consumer by an issuer within a payment processing system. The payment processing system includes a transaction handler processing the transactions for both the merchant and processing other of the transactions for other merchants (e.g., peers of the merchant). The merchant and the other merchants submit a corresponding transaction to a corresponding acquirer for processing by the transaction handler. The transaction handler requests the issuer of the corresponding account to obtain payment for the transaction from the corresponding account and for which the issuer forwards the payment to the transaction handler who forwards the payment to the acquirer to pay the merchant for the corresponding transaction. A percentage change in the transactions of one of the merchants in a category is calculated from the accumulated data for a current time period as compared with a past time period. A percentage change in the transactions of the other merchants in the category is also calculated from the accumulated data for the current time period as compared with the past time period. A report is rendered showing: the percentage change for the one merchant in the category and the percentage change for the other merchants in the category. The rendered report identifies growth in cashless sales of the merchant within the category compared to the cashless sales of the other merchants in the category.

BRIEF DESCRIPTION OF THE DRAWINGS

Implementations will become more apparent from the detailed description set forth below when taken in conjunction with the drawings, in which like elements bear like reference numerals.

FIG. 3 depicts an exemplary Venn Diagram showing sets, subsets, and sub-subsets of stored transaction data that may be stored in the exemplary memory sector of FIG. 2;

FIGS. 4 and 5 each depict portions of an Overall Sales and Marketing Performance Report created by an exemplary merchant benchmarking tool and showing metrics for a merchant and its peers;

FIGS. 6, 7 and 8 each depict portions of an Existing Customer Report created by an exemplary merchant benchmarking tool and showing metrics for a merchant and its peers;

FIGS. 9 and 10 each depict portions of a New Customer Report created by an exemplary merchant benchmarking tool and showing metrics for a merchant and its peers;

FIG. 11 depicts a flowchart of an exemplary method for rendering a report of an exemplary merchant benchmarking tool for delivery to a merchant.

DETAILED DESCRIPTION

A merchant benchmarking tool (MBT) is described. The MBT accesses transaction data of multiple merchants, analytically processes the transaction data, and provides particularly formatted outputs, such as electronically generated reports. The outputs can compare metrics describing sales (e.g., sales of transactions) of one of the merchants against peers of the merchant across various segments (e.g., inventory markets, merchant size, consumer groups). The outputs may assist the merchant to evaluate business goals of the merchant, such as sales performance (e.g., sales growth and market share, new and existing customer base, and average ticket), marketed targets, or loyalty programs, for example. The MBT can provide the merchant with outputs for spend analysis, performance gauges, rate of return, and customer purchasing performance (e.g., purchase frequency, retention, and share of wallet) within a market.

Figure 1:
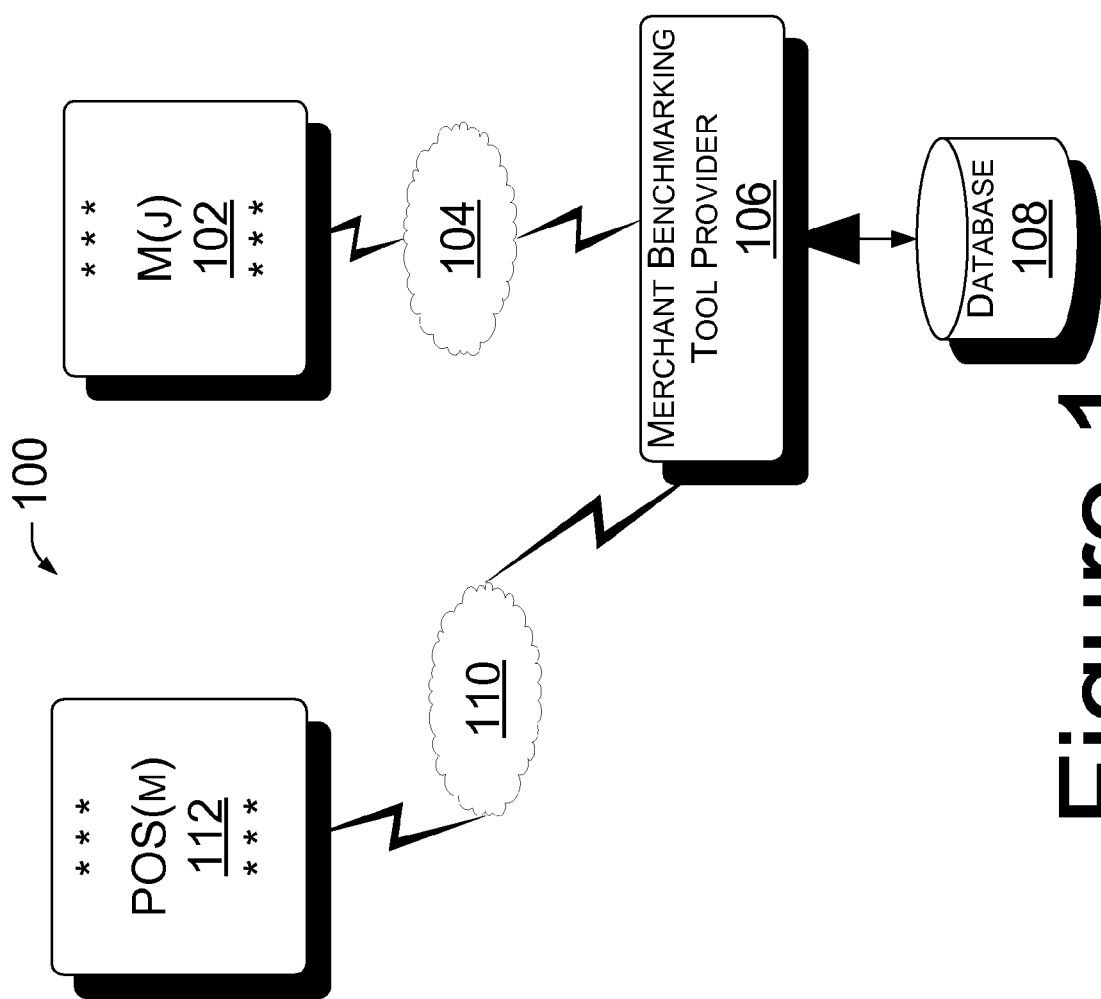
FIG. 1 depicts a block diagram illustrating an exemplary system for a merchant to receive analyzed data from a merchant benchmarking tool.

Referring to FIG. 1, a merchant benchmarking tool provider (MBTP) 106 provides multiple merchants M(1 to J) 102 access to the MBT, an output of the MBT, or a combination thereof via a network 104. As seen in FIG. 1, each merchant M(j) 102 of multiple merchants M(1 to J) 102 is represented by the M(j) 102, where j can be a value from 1 to J. The merchant M(j) 102 may be a person or entity that sells an inventory such as a good, a service, or a combination thereof. Examples of the merchant M(j) 102 can include: a manufacturer, a distributor, a retailer, a load agent, a service provider, or a healthcare provider. In a business-to-business setting, a second of the merchant M(j-3) 102 may be a consumer making a purchase from a first of the merchant M(j) 102. The MBTP 106 may include a computer hosting computer code that, when executed, performs the functions of the MBT. The computer may be communicatively linked to a database 108 storing the transaction data of multiple merchants such as the merchants M(1 to J) 102.

The MBT may have an interactive user interface allowing for data entry such as information about the merchant M(j) 102. The MBT can then utilize the inputted information along with other information to which the MBT has access, such as payment processing industry information or consumer transaction histories in the database 108 to create the reports (e.g., sales volume, new customer, existing customer reports). Optimization, data mining algorithms, relational database filtering algorithms, and other formulaic derivations can be utilized by the MBT to produce such reports. The MBT may be accessible offline or online, such as via the Internet or other networks. The MBT can also benchmark at the individual store or group of stores level.

The transaction data used by the MBT can be acquired from a single data source or a combination of data sources. The data source can be the transaction data obtained from each of a Point of Service terminal (POS). Here, a POS (m) 112 can be, for example, a payment card reader, a dispensing machine, a check reader, a cash register, an Automated Teller Machine, a handheld terminal wirelessly connected to a merchant computer, an interactive kiosk, or a computer code such as a compute program that is stored in a memory of: a computer, a cellular phone, a personal digital assistant (PDA), or a combination thereof. POS(m) 112 can correspond to merchants, including the merchants M(1 to J) 102 or other merchants that are not among the merchants M(1 to J) 102. One of the merchants having the POS (m) 112 may engage in one of the transactions with a consumer for inventory using the POS(m) 112 to capture or create the transaction data associated with the transaction. As seen in FIG. 1, each POS (m) 112 of multiple merchants is represented by the POS (m) 112, where m can be a value from 1 to M. The POS(m) 112 may form a first transmission having the transaction data for the transaction that can be delivered to MBTP 106 through a network 110 that may be the same network as the network 104.

Functions of the MBTP 106 may be performed by a bank, a financial institution, an issuer, an acquirer, or a transaction handler. In one implementation, the MBT can automatically generate and transmit the transaction data on the transactions that are processed within at least one payment processing system (e.g., a Visa, MasterCard, or American Express network). Processing the transactions in the payment processing system may include the merchant submitting transmissions to the transaction handler in the payment processing system via an acquirer of the merchant. For example, the merchant may obtain information about the account of the consumer, such as an account number of the account, at the POS (m) 112, and submit an authorization request to the acquirer. Upon receiving an authorization response to the authorization request indicating that an issuer that has issued the account has authorized the account as valid and has having enough funds, the merchant may transfer the goods or services of the merchant being purchased to the consumer. Thereafter, the merchant may initiate remittance of each of the transactions by submitting a clearing or settling request to the transaction handler via the acquirer. Clearing includes the exchange of financial information between the issuer and the acquirer. Settlement includes the transfer of funds.

Within the payment processing system, the consumer may be identified by the corresponding account of the consumer. For example, Ms. Mary Smith may have the account number "4234567890123456" associated with the account of Ms. Mary Smith. Consequently, if one of the transactions is payable upon "4234567890123456," then it can be determined that Ms. Mary Smith engaged in a transaction with one of the merchants in the payment processing system. A single account may have multiple account numbers, each associated with a corresponding one of the consumers that has rights to the account (e.g., joint account or corporate account with employees each having rights to conduct transactions upon the corporate account). In some cases, a plurality of the consumers may be associated with one of the accounts and the account may only have one account number. In such cases, each of the plurality of the consumers associated with the one account may be distinguished in other ways, such as via other data associated with the transaction. For example, if a magnetic stripe card associated with the one of the accounts is swiped at one of the POS(m) 112, track data stored in a band of magnetic material on the card may be sent via the network 110 and become part of the transaction data stored in the database 108. The track data may have the account number, an expiration date, a card verification value (CVV), a promotion code, a consumer identification code, or other data. Consequently, in this example, the consumer identification code from the track data can be used to distinguish one consumer from others who are associated the same account.

Other transaction data that can be stored in the database 108 may include the transaction data that includes aggregate sales information associated with purchases made within a market such as total cash sales in a women's clothing market for the year of 2007. Yet other transaction data stored in the database 108 may be that of a merchant that is anonymous but that is classified within a category, such as "sporting goods" retailer.

Figure 2:
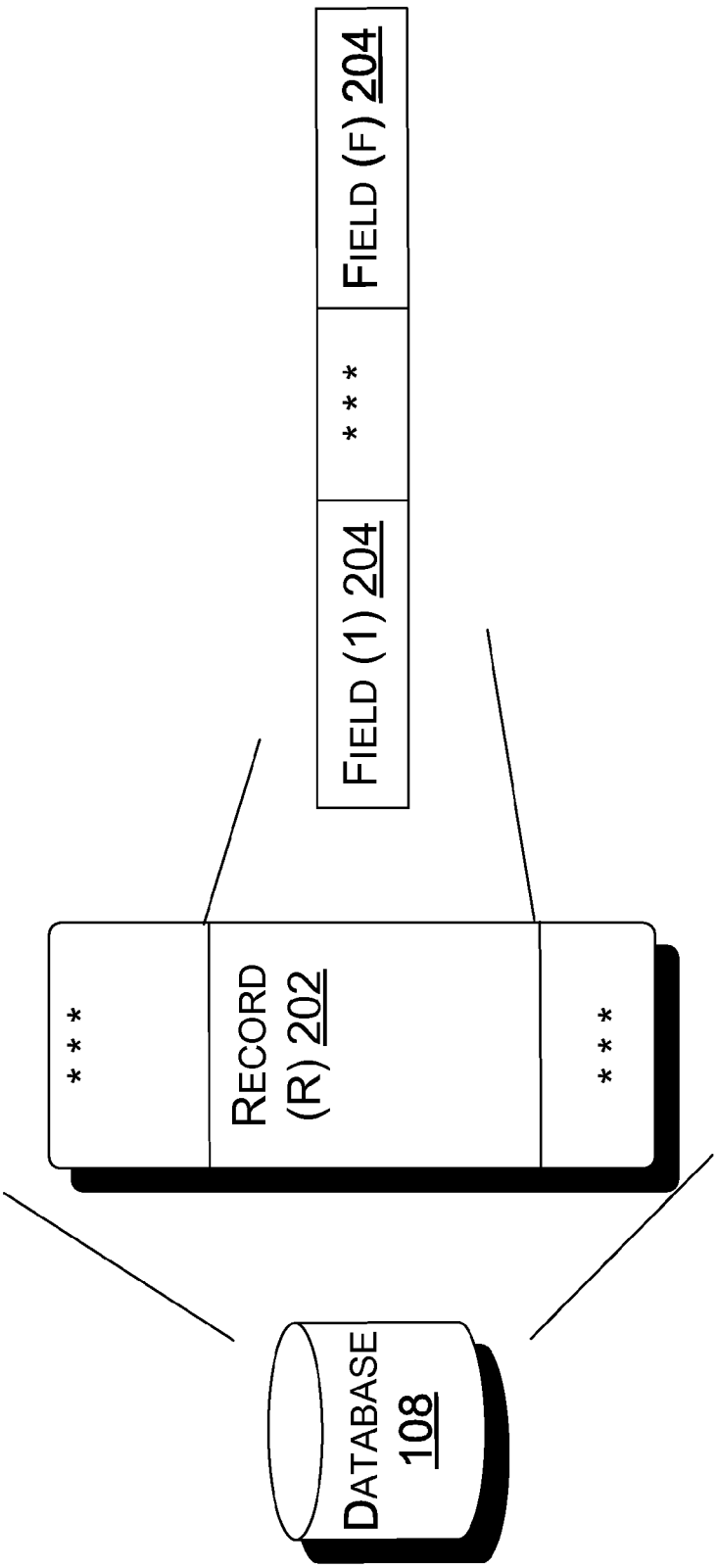
FIG. 2 depicts an exemplary memory sector having fields that store indicia of a transaction within the system of FIG. 1.

Referring to FIG. 2, the database 108 may be a relational database having records (1 to R) 202. The structure of the relational database may be serial, vertical, or another data structure known to a person of ordinary skill in the art. Each of the records (r) 202 within the database 108 may have corresponding fields (1 to F) 204. In one implementation, the record (r) 202 may store the transaction data received from the POS (m) 112 during a transaction conducted between the merchant M(j) 102 and the consumer for the purchase of inventory of the merchant M(j) 102. The fields (1 to F) 204 may include the transaction data for the one transaction. For example, the fields (1 through 8) 204 can include: an "amount field" such as the field (1) 204, to store an amount of funds to be transferred (authorized to be transferred from an account) or already transferred (e.g., Electronic Funds Transfer, cash, or cashless) from the consumer to the merchant M(j) 102; a "date field," such as the field (2) 204 storing a date on which the transaction between the merchant and the consumer occurred; a "hour field," such as the field (3) 204, to store the hour and minute that the transaction occurred; a "consumer identifier field," such as the field (4) 204, to store the consumer identifier code of the consumer, such as a name of the consumer; an "account identifier field," such as the field (5) 204, to store an account identifier of the account from which funds can be transferred; a "merchant identifier field", such as the field (6) 204, to store a merchant identifier that uniquely distinguishes the merchant from among a plurality of merchants; a "merchant category field," such as the field (7) 204, to store the merchant category of the merchant that engaged in the transaction with the consumer; or "product field," such as the field (8) 204, to store a Universal Product Code (UPC) of the inventory purchased. Some fields(j) 204 can be empty such that no data is stored therein.

The merchant category of the merchant M(j) 102 may be stored in the database 108 or derived from the transaction data stored in the database 108. For example, the merchant identifier that is uniquely associated with the corresponding merchant is usable to determine at least one category that the corresponding merchant may be classified under. To illustrate, the merchant M(j) 102 may be a group of stores organized as a single franchise of retail clothing business entity (e.g., Saks Fifth Avenue) or a single store that may be a franchisee of the franchisor (e.g., a Saks Fifth Avenue® store 9999 located in Los Angeles) having the corresponding merchant identifier (ID) "RETCL4456." The ID RETCL4456 can be used, such as via an algorithm or a look up table, to determine that the merchant M(j) 102 is classified as being in the following sample categories: Retailer, Clothing Store, High End Store, Women's Clothing Store, Store Located on Rodeo Drive, or combinations thereof. The merchant identifier may be a single string of alphanumeric data, a hashed code, or a series of text such as: a name, an address, and a phone number of the merchant M(j) 102.

The merchant category of the merchant M(j) 102 may be preset by the MBTP 106, specified by the merchant M(j) 102, or a combination thereof. For example, the merchant M(j) 102, such as Costco, may send a request to the MBTP 106 for a report of the MBT that will show other merchants that are classified in the same merchant category with Costco (i.e., Sam's Club or other such wholesale retailers).

The categories may be in different segments:
Organizational type
Public and private corporations
State and federal government
City and county government
Universities
School districts
Market size
Fortune 500 (annual revenue equal or above $2 billion)
Large market (annual revenue equal or above $250 million but below $2 billion)
Middle market (annual revenue equal or above $10 million but below $250 million)
Small market (annual revenue less than $10 million)
Industry
Manufacturing
Finance, insurance, banking, and real estate
Wholesale and retail trade
Software and Information Technology solutions
Transportation, warehousing, and delivery services
Telecommunications, media, and entertainment
Agricultural, mining, and construction
Professional, scientific, and technical services
Utilities
Other services The MBT can create sets, subsets, or sub-subsets of the transaction data stored in the database 108. The sets, subsets, or sub-subsets can be created by, for example, filtering the transaction data using the field (f) 204, such as the "merchant identifier field," the "merchant category field," or the "account identifier field" described in the example above or multiple of the fields (f, f+1, . . . f+n) 204. For example, a subset can be created using the "merchant category field" and the "account identifier field."

Referring to FIG. 3, in one implementation, the transaction data, shown in FIG. 3 as a transaction data 302, can be filtered to create two sets of the transaction data stored in the database 108: a first set 304 of the transaction data 302 in which the merchant M(j) 102 is the merchant engaged in each of the transactions in the first set 304, and a second set 306 of the transaction data 302 in which each of a plurality of the merchants are engaged in the transactions in the second set 306 and are each classified in at least one merchant category corresponding to a merchant category of the merchant M(j) 102.

For example, the first set 304 can be created by filtering the transaction data stored in the database 108 based on the corresponding merchant identifier of the merchant M(j) 102. Consequently, if the merchant identifier of the merchant M(j) 102 is "RETCL4456" then each record (r) 202 in the first set 304 of the transaction data 302 of the merchant M(j) 102 may have the ID "RETCL4456" in the corresponding "merchant identifier field" of the record (r) 202. The "merchant category field" in each record (r) 202 in the first set 304 may also indicate at least one merchant category that the merchant M(j) 102 may be in, such as "Retail Women's Clothing." Alternatively, or in combination, the merchant identifier of the merchant M(j) 102 may be sufficient to derive at least one of the merchant categories of the merchant M(j) 102 such that the at least one merchant category of the merchant M(j) 102 need not be stored in the record (r) 202.

Similarly the second set 306 can be created by filtering the transaction data 302 based on the merchant category of each of the merchants engaged in the corresponding transactions in the second set 306. For example, each of the merchants in the second set 306 may be classified under a merchant category that matches the merchant category of the merchant M(j) 102. Consequently, if the at least one merchant category of the merchant M(j) 102 is "Retail Women's Clothing" then each merchant in the second set 306 is also classified at least under the merchant category "Retail Women's Clothing." The at least one merchant category of the merchants in the second set 306 can be stored in the corresponding record (r) 202 in the second set 306, or can be derived from the merchant identifier of the corresponding merchant in the second set 306, or a combination thereof.

Subsets and sub-subsets can be similarly created. For example, a first subset 308 of the first set 304 can include portions of the transaction data 302 in which the merchant M(j) 102 engaged in the transactions therein and the date on which each of the transactions in the subset 308 occurred within a reporting time period (e.g., January 2004 to March of 2004). The subset 308 can be created by first creating the first set 304 then filtering a portion of the transaction data 302 in the first set 304 based on matching the date of each of the corresponding transactions in the first set 304 to the reporting time period. Alternatively, the subset 308 can be created by first filtering the transaction data 302 by matching the date of each of the corresponding transactions in the transaction data 302 to the reporting time period, then filtering those transactions in the transaction data 302 such that each of the transactions in the subset 308 was conducted by the merchant M(j) 102. In yet another alternative, both filtering processes can be done at the same time. Stated another way, the filtering processes can occur in a serial or parallel fashion.

Other set, subset, sub-subset, and so forth can be created, wherein the transaction data 302 is filtered based on information therein, such as the information in field (f) 204 or a combination of fields (f, f+1, . . . f+n) 204. For example, a sub-subset can include the transactions in the transaction data 302 in which: the merchant M(j) 102 was engaged in the transaction with a single consumer having an account within the payment processing system, the account number of the account being "4234567890123456," the transactions occurred in June of 2002, and each purchase was for a product having a Stock Keeping Unit (SKU) in the range of 011000189012 to 011000189099. A data point within the sub-subset can be: a transaction between Ms. Mary Smith and a Niemen Marcus® store 334 located in Manhattan, N.Y. on Jun. 11, 2002 for a Joseph Abbud silk tie payable upon the account "4234567890123456."

Similarly, the portion of the transaction data 302 in a set (e.g., the first set 304 or the second set 306) or subset (e.g., the first subset 308 or the second subset 310) may be for the transactions that have occurred on a type of account within the payment processing system. For example the first set 304 may contain the transaction data for the transactions of the merchant M(j) 102 that have occurred during the months of July 2002 to December 2002. The first subset 308 may be for the transaction data in which the merchant M(j) 102 engaged in the transactions that occurred in the month of July 2002 each of which is payable upon the accounts within the payment processing system that have "423455" as the first six digits of a corresponding account identifier, thereby distinguishing the account as a credit type account.

The transaction data in the set, subsets, or sub-subsets may be for the transactions that are payable upon such accounts as: prepaid accounts, credit accounts; debit accounts; corporate accounts; non-corporate accounts; small business accounts; government accounts; Flexible Spending Accounts, Health Savings Account, or a combination thereof. For example, the transactions within the subset 310 may each be payable upon a corresponding corporate account.

The portion of the transaction data 302 in a set or sub-set may be filtered based on a demographic of the consumers engaged in the transactions. For example, it may be know that the consumer with the credit card number "4234567890123456" is a female with a mailing address located in Naples, Fla. This demographic information may be stored in corresponding records (1-r) 202 wherein the consumer is engaged in the corresponding transactions stored in the records (1-r) 202. Alternatively, or in combination, the account identifier of the corresponding consumer may be usable to retrieve the demographic data of the consumer from another database.

The MBT can aggregate corresponding information in each of sets, subsets, sub-subsets of the transaction data 302. The MBT can aggregate by algorithmically combining the information therein. For example, the MBT may algorithmically combine the amount of each of the transactions within the first set 304 by adding each amount of funds transferred to the merchant M(j) 102 in the corresponding transactions in the first set 304, such as adding each amount of funds in the "amount field" stored in the field (1) 204. In another example, the MBT can add each amount of funds transferred to the merchants M(j, j+1, . . . j+n) 102 stored in the sub-subset 310.

In another implementation, the MBT can algorithmically combine components of the transaction data without creating the sets or subsets of the transaction data 302. For example, each of the transactions within the database 108 can be interrogated to determine if a match to a criteria exists. If there is a match, the component is algorithmically combined. To illustrate, each of the transactions in the database 108 may be analyzed to determine whether the merchant M(j) 102 conducted the corresponding transaction in the database 108. The determination can be made by matching the merchant identifier of the merchant M(j) 102 with that of the transaction within the database 108 being analyzed. If a match exists, then the amount of funds transferred to the merchant M(j) 102 for the analyzed transaction can be added to a running total.

The MBT can provide an output to the merchant M(j) 102 conveying trends in the transaction data. In one implementation, the MBT shows a performance of the merchant M(j) 102 compared to that of a plurality of merchants that are each classified in at least one merchant category that the merchant M(j) 102 is also classified under (hereinafter, the "peer"). While the report may show a comparison of the average sales statistics for the merchant M(j) 102 relative to that of its peers as determined from the merchant category, the report withholds peer identities from the merchant for whom the report was prepared. The performance of the peer may either include or exclude the performance of the merchant M(j) 102 depending on a desired output.

The output may be on printed paper or the MBT can render the output upon a merchant computer screen linked to the computer hosting the MBT. Moreover, changes in the sales performance can be highlighted using a color scheme wherein the performance as compared to the peers of the merchant can be color coded. For example, when the merchant M(j) 102 is leading its peers in sales for a reporting month by a 10 percent margin, the statistics for that month may be in a green colored font. On the other hand, when the merchant M(j) 102 is lagging its peers in sales by 10 percent, the statistics for that month may be in a red colored font. Similarly, changes in metric performance from one period to the next can be color coded. For example, where the merchant has gained in market share by 10 percent over the past month, the statistic for the month may be in blue while a loss in market share of 10 percent may be in purple. Different gray scales, colors, line formation, or fonts can be used to display the metric. Moreover, for electronically rendered reports, the intensity may be dynamically presented wherein the intensity may have a rate of change while being displayed, such as a number being faded in and out while the merchant M(j) 102 is viewing the report. Audible cues similarly varying in intensity corresponding to value are similarly contemplated for the rendered report.

The MBT can provide trend information within classifications of accounts within the payment processing system, wherein the account classification is defined by a chronological sequence of corresponding transactions payable upon the corresponding account of a corresponding consumer.

For example, the report may show trends in the following account classifications:

1. "Existing Customer:" a consumer that has engaged in at least two transactions upon an account with a first merchant (e.g., the merchant M(j) 102 or its peers) within the same category as that of the merchant M(j) 102 including a first transaction during a first time period and a second transaction during a second time period that is subsequent to the first time period;

2. "New Customer:" a consumer that has engaged in at least one transaction upon an account with a first merchant within the category of the merchant M(j) 102 during a second time period but not during the first time period;

3. "Lost Customer" a consumer that has engaged in at least one transaction upon an account with a first merchant within the category of the merchant M(j) 102 during a first time period but not during a second time period; and 4. "Lost to Competitor Customer": a Lost Customer that further has engaged in at least one transaction upon an account in a second time period with a merchant different from the first merchant.

The table below illustrates how the account classifications can be designated based on a timeline if the first time period is from January 1st to March 31st and the second time period is from April 1st to June 30. In the table below, "X" denotes that a sample consumer has engaged in one of the transactions with the first merchant:

| A sample consumer/account can be classified as: | January | February | March | April | May | June |
|---|---|---|---|---|---|---|
| Existing Customer | X | | X | | X | |
| New Customer | | | | | | X |
| Lost Customer | | | X | | | |
| Lost to Competitor Customer | | X | | | X (with a 2nd merchant) | |

For example, the first subset 308 may be for a "Lost to Competitor Customer" which can include a portion of the transaction data 302 wherein the corresponding consumers charged a credit card to pay the merchant M(j) 102 during the month of March of 2002, did not charge the same credit card to pay the merchant M(j) 102 during the month of June of 2002, but did charge the same credit card in the month of June 2002 to pay a merchant M(j+1) 102 that is one of the peers of the merchant M(j) 102. A single data point within the first subset 304 for the "Lost to Competitor Customer" can be: a transaction of Ms. Mary Smith with a Niemen Marcus® store in Niagara Falls, N.Y. occurring on Jun. 4, 2002 on account number "4234567890123456" wherein Ms. Mary Smith engage in another transaction on the credit card with a Saks Fifth Avenue® store in July 2002 but does not engages in another transaction on the credit card with the Niemen Marcus® store in Niagara Falls in July of 2002.

The respective time periods (e.g., the first time period or the second time period) that determines whether one of the consumers is one of the "Existing Customers," "New Customers," "Lost Customers," or "Lost to Competitor Customers" may be preset. For example, the values for the time periods may be set by the MBTP 106 or the merchant M(j) 102. To illustrate, the first time period may be set by the merchant M(j) 102 as four (4) months and the second time period may be preset by the merchant M(j) 102 at the next three (3) months.

Those skilled in the art can appreciate other account classifications. For example, Active Customers may be consumers that use a corresponding account to conduct transactions with any of the merchants, whether the merchant is one of the peers of the merchant M(j) 102 or not; Inactive Customers may be consumers that are not Lost Customers but have not engaged in a transaction within a time period that is shorter than the second time period; or Returning Customers may be consumers that were once Lost Customers but have recently engaged in a transaction with one of the peers of the merchant M(j) 102.

The report may show trends in other metrics as well, such as:

1. An "Overall Sales:" total amount of funds for transfer (e.g., authorized to be transferred, actually transferred, or a combination) over a first reporting time period to the merchant M(j) 102 or to peers of the merchant M(j) 102, respectively;

2. A "Ticket Amount:" an amount of funds for transfer in one of the transactions between the consumer and the corresponding merchant;

3. A "Wallet Share:" a total amount of funds transferred from a first account to the merchant M(j) 102 over a first reporting time period as compared to the total amount of funds transferred from the first account to the peers of the merchant M(j) 102 over the first reporting time period.

4. A "Gap Value:" a difference between a first metric (e.g., for the merchant M(j) 102) and a second metric (e.g., for the peers of the merchant M(j) 102).

Referring to FIGS. 4-10, each depicts one or more screen shots of portions of a corresponding report rendered in a predetermined electronic format. The performance of the merchant M(j) 102 in comparison to its peers is illustrated in different reports such as a Overall Sales and Marketing Performance Report 400 (FIGS. 4 through 5), an Existing Customer Report 600 (FIGS. 6 through 8), and a New Customer Report 900 (FIGS. 9 through 10). Each report displays metrics reflecting the performance of the merchant M(j) 102 in comparison to its peers.

The reports may have the following metrics:

The Overall Sales and Marketing Performance Report 400

1. Total Sales Growth 402:
   a. Total Sales Growth of the merchant M(j) 102 (shown in FIG. 4 as 408)—A percentage change in Overall Sales of the merchant M(j) 102 from New Customers and Existing Customers for a first reporting time period as compared with a second reporting time period (e.g., a current month compared to a past month); and
   b. Overall Sales of peers of the merchant M(j) 102 (shown in FIG. 4 as 410)—A percentage change in Overall Sales of peers of the merchant M(j) 102 from New Customers and Existing Customers for the first reporting time period as compared with the second reporting time period.

2. Total Customer Count Growth 404: a frequency of use of each of the accounts used in the transactions with each of the merchant M(j) 102 and its peers, respectively. In the example shown in FIG. 4, in March of 2006, the merchant M(j) 102 had an increase of 5.9% (shown at 412) in the number of consumers that engaged in the transactions with the merchant M(j) 102 as compared to the number of consumers that engaged in the transactions with the merchant M(j) 102 in the month of February 2006. The peers of the merchant M(j) 102 had only a 3.9% (shown at 414) increase in the number of consumers that engaged in the transactions with corresponding peers of the merchants M(j) 102 in March 2006 as compared to the number of consumers that engaged in the transactions with corresponding peers of the merchant M(j) 102 in the month of February 2006. Consequently, there was a gap decrease 416 in between the merchant M(j) 102 and its peers in March (having a Gap Value of 5.9−3.9=2) as compared to February 2006 (having a Gap Value of 7.1−4.6=2.5).

3. Exiting Customer Sales Growth 406: the Total Sales Growth among Existing Customers.
4. New Customer Sales Growth 502: the Total Sales Growth among New Customers.
5. Peer Group Market Share 504: A percentage share of the merchant M(j) 102 of the Overall Sales (e.g., total sales of the merchant M(j) 102 and its peers) for each of the following consumers:
   a. All Customers 510 (e.g., Existing Customers, New Customers, and Lost Customers);
   b. Existing to Peers 512: Existing Customers, wherein the first merchant is any of the merchants that are peers of the merchant M(j) 102;
   c. New to Peers 514: New Customers, wherein the first merchant is any of the merchants that are peers of the merchant M(j) 102;
   This metric may show the performance of the merchant M(j) 102 as well as that of its peers. For example, an increase in the Existing Customers for the peers of the merchant M(j) 102 might be due to superior products sold among the peers of the merchant M(j) 102, loyalty programs, or competitive discounts.
6. Relative Share of Sales Existing vs. New Customers 506: the Total Sales Growth of the Existing Customers as compared to New Customers (e.g., the Existing Customer Sales Growth reported for a month can be divided by the Total Sales Growth reported for the same month).
7. Relative Share of Sales: Consumer v. Commercial Customers 508: A percentage of the Overall Sales of the merchant M(j) 102 and peers of the merchant M(j) 102, respectively, from corresponding noncommercial accounts as compared to the Overall Sales from corresponding commercial accounts.

The Existing Customer Report 600
1. Drive Larger Average Tickets 602: A sequential percentage change in an average of the Ticket Amount among Existing Customers who purchased in a reporting month for each of the merchant M(j) 102 and its peers, respectively.
2. Increase Purchase Frequency 604: an average number of the transactions over the first reporting period for a percentage of accounts based on the frequency of use of the account or an average of corresponding Ticket Amounts (e.g., the top 10% of the accounts frequently used in the transactions with each of the merchant M(j) 102 and peers of the merchant M(j) 102, respectively).
3. Increase Recency 702: a percentage of the Existing Customers whose most recent purchase is within an enumerated time period (e.g., if 17% of Existing Customers fall into a "3 months ago" time period, then 17% of the Existing Customers of the merchant M(j) 102 have made a purchased from the merchant M(j) 102 within in the past 3 months).
4. Increase Wallet Share vs. Competitors 704: the Wallet Share for each of the merchant M(j) 102 and its peers, respectively, that come from a portion of the Existing Customers (e.g., the Top 10% of the Existing Customers that spend more with the merchant M(j) 102 as compared to peers of the merchant M(j) 102).
5. Increase Customer Total Spend 802: Overall Sales over a reporting time period for a percentage of the Existing Customers based on the Wallet Share of each of the merchant M(j) 102 and peers of the merchant M(j) 102, respectively.
6. Increase Retention Rate 804: A percentage of Existing Customers of each of the merchant M(j) 102 and peers of the merchant M(j) 102, respectively, for the first reporting time period who were each also Existing Customers of each of the merchant M(j) 102 and peers of the merchant M(j) 102 for the second reporting time period.

The New Customer Report 900
1. New Customer Count Growth 902: a percentage growth from the first reporting time period compared to the second reporting time period of a frequency of use of each of the accounts of New Customers that were used in the transactions with each of the merchant M(j) 102 and its peers, respectively.
2. Attract Competitors' Customers/Attract New Customers to the Category 1002: a percentage of New Customers for the first reporting time period who are also Existing Customers with at least one of the peers of the merchant M(j) 102 that is not the merchant M(j) 102.
3. Convert New Customers into Repeat Customers 1004: a percentage of New Customers during the first reporting time period that conducted a second transaction during the second reporting time period for each of the merchant M(j) 102 and peers of the merchant M(j) 102, respectively.

The reports described above may be linked to one another. For example, the Total Sales Growth 402 may be electronically displayed to the merchant M(j) 102. Portions within the report may contain hyperlinks to other portions of the same report or to other reports. For example, if the Existing Customer Report 600 renders the metric Total Sales Growth 402 showing that the merchant M(j) 102 is leading its peers, the merchant M(j) 102 may be able to "drill" into more detail in the various reports (e.g., via selecting the hyperlink having an address of a portion of the Existing Customer Report 600) to identify the possible drivers of the performance of the merchant M(j) 102. By accessing the other reports, the merchant M(j) 102 may discover that the lead is due to an increase in sales with New Customers rather than with Existing Customers or that the lead is due to the transactions that have been payable upon non-corporate accounts rather than corporate accounts.

Referring to FIG. 11, a flow chart of an exemplary method 1100 for graphically rending the report to the merchant M(j) 102 starts at a step 1102. At the step 1102, indicia of the transactions (e.g., the transaction data) of the plurality of the merchants is stored within the database (e.g., the database 108). The indicia of the transactions can include: a date on which each of the transactions occurred; an amount of funds that can be transferred from the account of the corresponding consumer (e.g., Existing Customers, New Customers, Lost Customers, Lost to competitor Customers, or a combination thereof); the merchant identifier of the corresponding merchant receiving the amount of funds (e.g., merchant M(j) 102 or one of its peers); at least one merchant category of the corresponding merchant receiving the amount of funds; a total amount of funds transferred to a plurality of merchants that are peers of the merchant M(j) 102; or a combination thereof. At step 1104, the merchant category of a first of the merchants, such as the merchant M(j) 102 is determined. For example, the merchant identifier of the merchant M(j) 102 may be used to determine at least one merchant category of the merchant M(j) 102.

At step 1106, for the transactions that have occurred within a first reporting time period, a first merchant set and a first peer set are created. The transactions in the first merchant set 304 are each with the merchant M(j) 102. For example, each of the transactions in the first merchant set may have the merchant identifier of the merchant M(j) 102. Similarly, the transactions in the first peer set are each with the peers of the merchant M(j) 102, which may include the merchant M(j) 102. As stated previously, the peers of the merchant M(j) 102 are each in at least one of the merchant categories under which the merchant M(j) 102 is classified. In one implementation, the corresponding merchant identifiers stored in association with each of the transactions is matched against the determined at least one merchant category of the merchant M(j) 102. If there is a match, the transactions having the match are filtered into the first peer set.

At step 1108, for the transactions that have occurred within a second reporting time period, a second merchant set and a second peer set are created. Other such merchant sets and peer sets can also be created, each of which contains the transactions that occurred during a corresponding reporting time period.

At step 1110, the transaction data associated with respective transactions within each of the merchant sets (e.g., the first, second, or successive merchant sets) and the peer sets (e.g., the first, second, or successive peer sets), respectively, is algorithmically combined. The data may be information within one of the fields (f) 204, derived from the information within one of the fields (f) 204, or a combination thereof. For example, each Ticket Amount within the first merchant set may be added to equal the Overall Sales of the merchant M(j) 102 during the first reporting time period. Alternatively, or in combination, the frequency of use of a first account of a first consumer may be combined. For example, if the first consumer uses the account with the account identifier "4234567890123456" to engage in five (5) transactions with the merchant M(j) 102 during the first reporting time period, then the algorithmic combination would equal five (5).

The algorithmic combination may be a sum calculation, a mean calculation, a median calculation, a mode calculation, a percentage of the sum calculation, or a combination thereof, for example. To illustrate, the Overall Sales for the merchants that are peers of the merchant M(j) 102 may first be averaged, then a percentage difference in the average can be calculated and shown in the report (e.g., the average of the Overall Sales of peers for the second reporting time period can be compared to that of the first reporting time period). Other forms of algorithm combinations are known to one of ordinary skill in the art, such as, weighted summations, percentage change of transaction data values over several time periods, or results from data mining analysis.

In one implementation, a percentage difference in Overall Sales of the merchant M(j) 102 and its peers is calculated for a series of sequential pairs of adjacent reporting time periods. For example, the percentage difference in the Overall Sales of merchant M(j) 102 may be compared to its peers for three of the pairs of adjacent reporting time periods defined as: March 2006 and April 2006; April 2006 and May 2006; and May 2006 and June 2006.

At step 1112, a report is generated so as to include information based on the algorithmically combined data. At step 1114, the report is graphically rendered, such as to a computer display.

In another implementation, data is accumulated from transactions, such as cashless transactions made payable upon a corresponding account within the payment processing system. A percentage change in the transactions of the merchant is calculated for each of a current time period (e.g., the first reporting time period) and a past time period (e.g., the second reporting time period). The percentage change in the transactions of the peers of the merchant is also calculated for each of the current time period and the past time period. The report is rendered showing each of the percentage change for the merchant and for its peers, whereby the rendered report identifies growth in cashless sales of the merchant within the category compared to the cashless sales of the peers of the merchant within the category. The Gap Value for the percentage change for the merchant compared to the peers of the merchant can also be calculated and rendered in the report in an audible and/or visual intensity corresponding to the Gap Value.

The report may show a number of transactions on a single account, a plurality of accounts, or a classification of accounts. For example, the number of transactions on one of the accounts during the reporting time period can be counted for each of the merchant M(j) 102 and its peers for rendering in the report. Alternatively, or in combination, the counting can occur for the accounts in a corresponding account classification and reported, such as counting the number of times corresponding Existing Customers shop with the merchant M(j) 102 versus the number of times corresponding Existing Customers shop with its peers.

To illustrate, the merchant M(j) 102 may be American Broadcasting Company® Television Network ("ABC"). ABC may use an Internet browser loaded on a merchant computer within a local area network of ABC. The Internet browser may communicate, via the Internet, with the host computer of the MBTP 106 that may be a transaction handler of a payment processing system. For example, ABC may form a transmission addressed to the transaction handler requesting one of the reports. ABC may conduct an interactive session with the MBT so as to perform the computer implemented method 1100 as seen in FIG. 11 or a variation thereof.

During the interactive session, ABC may indicate that its wants an electronic version of the Overall Sales and Marketing Performance Report 400 for the consumers that have used a corresponding corporate account within the payment processing system to pay ABC for services and to pay its peers. ABC may specify that the report should show various metrics for the year 2000. ABC may indicate to the transaction handler that its peers include: National Broadcasting Company® Television Network ("NBC") and other "television networks."

The MBT may interrogate the database 108 and sum each Ticket Amount of the transactions that: occurred in the year 2000; were conducted with ABC; and were payable upon a corresponding account that has "42356" as the first six digits of a corresponding account identifier (e.g., thereby identifying the account as a corporate account).

Similarly, the MBT may interrogate the database 108 to determine the Overall Sales of the peers of ABC. The MBT may determine the category of ABC to be "Television Network" "Streamcast Merchants," "Broadcaster," or "Television Services." The MBT may sum each Ticket Amount of the transactions that: occurred in the year 2000; were conducted with the peers of ABC; and were payable upon a corresponding account that has "42356" as the first six digits of the corresponding account identifier. Alternatively, the MBT may have stored the Overall Sales for the peers of ABC in the database 108 such that individual Ticket Amounts are not stored in the database 108. Other metrics can be similarly calculated for the requested Overall Sales and Marketing Performance Report 400. Thereafter, the MBT can render the metrics for each of ABC and its peers, including color coding for Gap Value leads and lags of ABC compared to its peers.

The Payment Processing System

Figure 12:
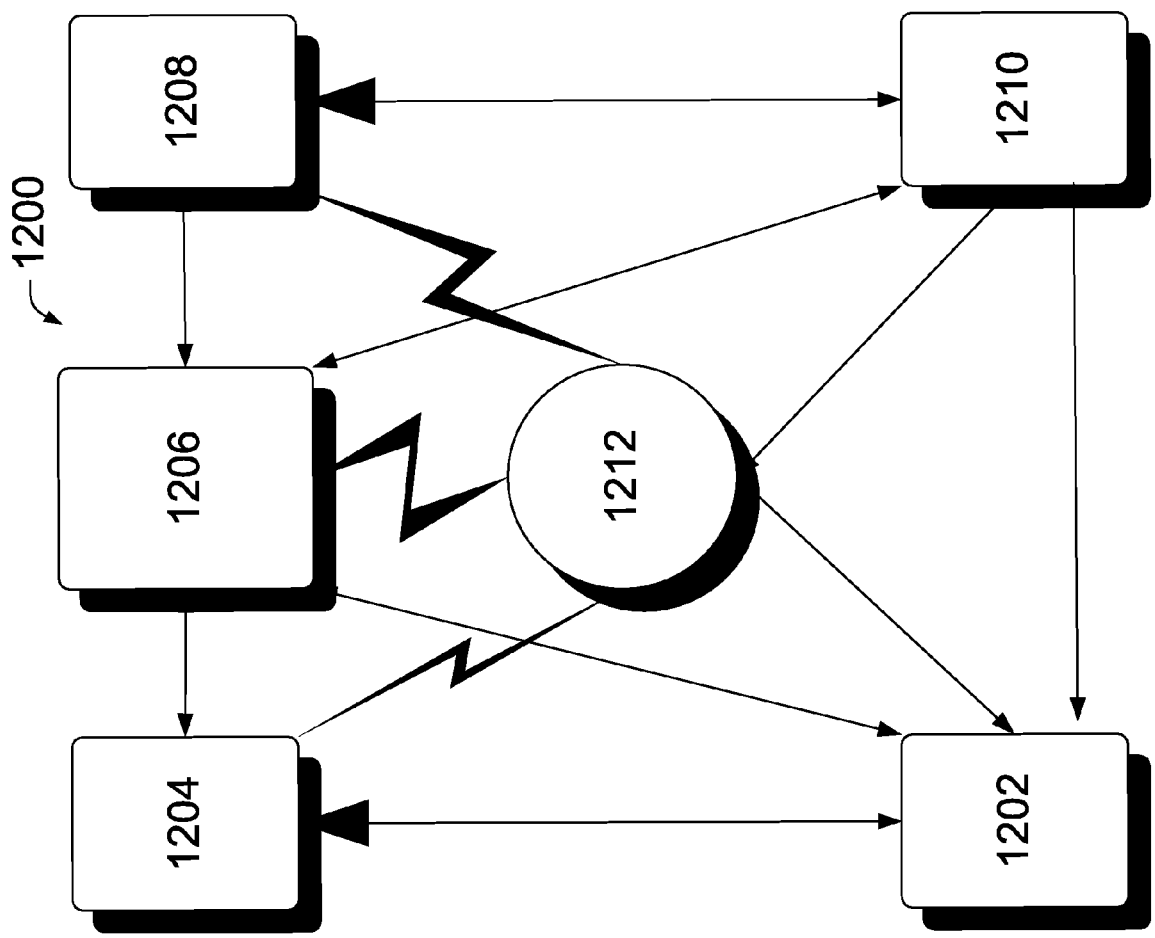
FIG. 12 depicts a block diagram of an exemplary payment processing system.

As background information for the foregoing description, as will be readily understood by persons of ordinary skill in payment systems, the transaction in the payment system can include participation from different entities that are each a component of the payment processing system. An exemplary payment processing system is depicted in FIG. 12 as the payment processing system 1200. The payment processing system 1200 includes an issuer 1204 such as the issuer; a transaction handler 1206, such as the transaction handler; an acquirer 1208 such as the acquirer; a merchant 1210 such as the merchant M(j) 102; and a consumer 1202 such as the consumer. The acquirer 1208 and the issuer 1204 can communicate through the transaction handler 1206. The merchant 1210 may utilize at least one of the POS (m) 112 that can communicate with the acquirer 1208, the transaction handler 1206, or the issuer 1204. Thus, the POS (m) 112 is in operative communication with the payment processing system 1200.

Typically, the transaction begins with the consumer 1202 presenting a corresponding account number of the account, such as through the use of a computer terminal or a portable consumer device 1212, to the merchant 1210 to initiate an exchange for a good or service. The consumer 1202 may be an individual or a corporate entity. The consumer 1202 may be an account holder of the account issued by the issuer 1204 such as a joint account holder of the account or a person having access to the account such as an employee of a corporate entity having access to a corporate account. The portable consumer device 1212 may include a payment card, a gift card, a smartcard, a smart media, a payroll card, a health care card, a wrist band, a machine readable medium containing account information, a keychain device such as the SPEED-PASS® commercially available from ExxonMobil Corporation or a supermarket discount card, a cellular phone, personal digital assistant, a pager, a security card, a computer, an access card, a wireless terminal, or a transponder, for example. The portable consumer device 1212 may include a volatile or a non-volatile memory to store information such as the account number or a name of the account holder.

The merchant 1210 may use an acceptance point device, such as the POS (m) 112, to obtain account information, such as the indicator for the account (e.g., the account number of the account), from the portable consumer device 1212. The portable consumer device 1212 may interface with the POS (m) 112 using a mechanism including any suitable electrical, magnetic, or optical interfacing system such as a contactless system using radio frequency, a magnetic field recognition system, or a contact system such as a magnetic stripe reader. The POS (m) 112 sends a transaction authorization request to the issuer 1204 of the portable consumer device 1212. Alternatively, or in combination, the portable consumer device 1212 may communicate with the issuer 1204, the transaction handler 1206, or the acquirer 1208.

The issuer 1204 may submit an authorized response for the transaction via the transaction handler 1206. Authorization includes the issuer 1204, or the transaction handler 1206 on behalf of the issuer 1204, authorizing the transaction in connection with instructions of the issuer 1204, such as through the use of business rules. The transaction handler 1206 may maintain a log or history of authorized transactions. Once approved, the merchant 1210 can record the authorization and allow the consumer 1202 to receive the good or service.

The merchant 1210 may, at discrete periods, such as the end of the day, submit a list of authorized transactions to the acquirer 1208 or other components of the payment processing system 1200 for clearing and settling. The transaction handler 1206 may compare the submitted authorized transaction list with its own log of authorized transactions. If a match is found, the transaction handler 1206 may route the clearing and settling request from the corresponding acquirer 1208 to the corresponding issuer 1204 involved in each transaction. Once the acquirer 1208 receives the payment of the transaction from the issuer 1204, it can forward the payment to the merchant 1210 less any transaction costs, such as fees.

There may be intermittent steps in the foregoing process, some of which may occur simultaneously. For example, the acquirer 1208 can initiate the clearing and settling process, which can result in payment to the acquirer 1208 for the amount of the transaction. Alternatively, or in combination, the acquirer 1208 may request from the transaction handler 1206 that the transaction be cleared and settled.

It should be understood implementations can be in the form of control logic, in a modular or integrated manner, using software, hardware or a combination of both. The steps of a method, process, or algorithm described in connection with the implementations disclosed herein may be embodied directly in hardware, in a software module executed by a processor, or in a combination of the two.

The various steps or acts in a method or process may be performed in the order shown, or may be performed in another order. Additionally, one or more process or method steps may be omitted or one or more process or method steps may be added to the methods and processes. An additional step, block, or action may be added in the beginning, end, or intervening existing elements of the methods and processes. Based on the disclosure and teachings provided herein, a person of ordinary skill in the art will appreciate other ways and/or methods for various implements.

It is understood that the examples and implementations described herein are for illustrative purposes only and that various modifications or changes in light thereof will be suggested to persons skilled in the art and are to be included within the spirit and purview of this application and scope of the appended claims.

What is claimed is:

1. A computer implemented method comprising:
processing via a transaction processor handler a first transaction on an account issued to a first consumer by a first issuer, for a first merchant, the first merchant submitting the first transaction to a first acquirer, the first acquirer submitting the first transaction to the transaction processor handler;
processing via the transaction processor handler a second transaction on an account issued to a second consumer by a second issuer, for a second merchant, wherein the second merchant is identified as a peer merchant in a similar line of business as the first merchant, the second merchant submitting the second transaction to a second acquirer, the second acquirer submitting the second transaction to the transaction processor handler;
requesting, via the transaction processor handler, payment for the first transaction, wherein requesting includes requesting from the first issuer of the corresponding account for the first transaction payment for the first transaction and additionally includes a first customer identifier code different from an account identifier;
requesting, via the transaction processor handler, payment for the second transaction, wherein requesting includes requesting from the second issuer of the corresponding account for the second transaction payment for the second transaction and additionally includes a second customer identifier code different from an account identifier;
accumulating data from a plurality of first and second transactions;

processing the accumulated data to assign a particular one of a plurality of distinct designations to each of a plurality of customer accounts, wherein a first of the distinct designations is a new customer designation and a second of the distinct designations is a lost to competitor designation;

calculating from the accumulated data, via a computer:
  a percentage change in transaction data for new customer accounts and lost to competitor accounts of the first merchant, wherein the first merchant is in a category of peer merchants; and
  a percentage change in transaction data for new customer accounts and lost to competitor accounts of the peer merchants; and generating a report including:
  the percentage change in transaction data for the new customer accounts and the lost to competitor accounts of the first merchant; and
  the percentage change in transaction data for the new customer accounts and the lost to competitor accounts of the peer merchants; and processing the accumulated data to generate:
  purchase frequency and purchase recency metrics for accounts of the first merchant and the peer merchants having an existing customer designation;
  customer count growth and attracting competitor customers metrics for accounts of the first merchant and the peer merchants having the new customer designation;
  lost customers metrics for accounts of the first merchant and the peer merchants having a lost customer designation; and
  customers lost to competitors metrics for accounts of the first merchant and the peer merchants having the lost to competitor customer designation.

2. The computer implemented method as defined in claim 1, further comprising:
  repeating the calculating for a series of sequential pairs of adjacent time periods; and
  generating a report for each said pair of adjacent periods including:
    the percentage change for the first merchant; and
    the percentage change for the peer merchants, whereby the report for each said pair of adjacent periods identifies growth in cashless sales of the first merchant compared to growth in cashless sales by the peer merchants.

3. The computer implemented method as defined in claim 1, wherein:
  there is a difference between:
    the percentage change for the first merchant; and
    the percentage change for the peer merchants; and
    the value of the difference is rendered in the report in an intensity corresponding to the value thereof.

4. The computer implemented method as defined in claim 1, further comprising:
  calculating from the accumulated data a number of transactions on each of the plurality of customer accounts for:
    the first merchant and the percentage change thereof for a current time period and a past time period; and
    the peer merchants and the percentage change thereof for the current time period and the past time period; and
  generating a report including:
    the percentage change in the number of transactions for the first merchant within the current time period as compared with the past time period; and
    the percentage change in the number of transactions for the peer merchants within the current time period as compared with the past time period.

5. The computer implemented method as defined in claim 1, further comprising using a merchant identifier to determine the category, wherein the category is unique to the corresponding merchant within a payment processing system.

6. The computer implemented method as defined in claim 1, wherein the percentage change for the first merchant, the peer merchants, or both, is at least one of:
  a percentage change in a total funds transferred for a current time period as compared with a past time period;
  a percentage change in an average of funds transferred for the current time period as compared with the past time period;
  a percentage change in a number of times an account was charged for the current time period as compared with the past time period;
  a percentage change in a number of times corresponding accounts having a particular account designation were charged for the current time period as compared with the past time period; and
  combinations thereof.

7. The computer implemented method as defined in claim 1, further comprising calculating from the accumulated data:
  a total funds transferred for the first merchant for a current time period; and
  a total funds transferred for the peer merchants for the current time period, wherein the report further shows:
  the total funds transferred for the first merchant; and
  the total funds transferred for the peer merchants.

8. The computer implemented method as defined in claim 7, further comprising:
  repeating each said calculating of total funds for a series of sequential of adjacent time periods; and
  generating a report for each of said adjacent periods including:
    the total funds transferred for the first merchant; and
    the total funds transferred for the peer merchants, whereby the report for each said adjacent periods identifies growth in cashless sales by the first merchant compared to growth in cashless sales of the peer merchants.

9. The computer implemented method as defined in claim 1, further comprising:
  calculating from the accumulated data, via a computer:
  a frequency of use of each of the accounts used in the transactions with each of the merchants.

10. The computer implemented method as defined in claim 1, further comprising:
  calculating from the accumulated data, via a computer:
  a percentage difference in overall sales between the first merchant and the peer merchants,
  wherein the percentage difference is calculated by comparing overall sales for at least two pairs of adjacent time periods.

11. An apparatus, comprising:
  a memory; and
  a processor disposed in communication with said memory, and configured to issue a plurality of processing instructions stored in the memory, wherein the processor issues instructions to:
  process via a transaction processor handler a first transaction on an account issued to a first consumer by a first issuer, for a first merchant, the first merchant submitting the first transaction to a first acquirer, the first acquirer submitting the first transaction to the transaction processor handler;

process via the transaction processor handler a second transaction on an account issued to a second consumer by a second issuer, for a second merchant, wherein the second merchant is identified as a peer merchant in a similar line of business as the first merchant, the second merchant submitting the second transaction to a second acquirer, the second acquirer submitting the second transaction to the transaction processor handler;

request, via the transaction processor handler, payment for the first transaction, wherein requesting includes requesting from the first issuer of the corresponding account for the first transaction payment for the first transaction and additionally includes a first customer identifier code different from an account identifier;

request, via the transaction processor handler, payment for the second transaction, wherein requesting includes requesting from the second issuer of the corresponding account for the second transaction payment for the second transaction and additionally includes a second customer identifier code different from an account identifier;

accumulate data from a plurality of first and second transactions;

process the accumulated data to assign a particular one of a plurality of distinct designations to each of a plurality of customer accounts, wherein a first of the distinct designations is a new customer designation and a second of the distinct designations is a lost to competitor designation;

calculate from the accumulated data, via the processor:
 a percentage change in transaction data for new customer accounts and lost to competitor accounts of the first merchant, wherein the first merchant is in a category of peer merchants; and
 a percentage change in transaction data for new customer accounts and lost to competitor accounts of the peer merchants;

generate a report including:
 the percentage change in transaction data for the new customer accounts and the lost to competitor accounts of the first merchant; and
 the percentage change in transaction data for the new customer accounts and the lost to competitor accounts of the peer merchants; and process the accumulated data to generate:
 purchase frequency and purchase recency metrics for accounts of the first merchant and the peer merchants having an existing customer designation;
 customer count growth and attracting competitor customers metrics for accounts of the first merchant and the peer merchants having the new customer designation;
 lost customers metrics for accounts of the first merchant and the peer merchants having a lost customer designation; and
 customers lost to competitors metrics for accounts of the first merchant and the peer merchants having the lost to competitor customer designation.

12. The apparatus as defined in claim 11, wherein the processor further issues instructions to:
 repeat the calculating for a series of sequential pairs of adjacent time periods; and
 generate a report for each said pair of adjacent periods including:
  the percentage change for the first merchant; and
  the percentage change for the peer merchants, whereby the report for each said pair of adjacent periods identifies growth in cashless sales of the first merchant compared to the growth in cashless sales of the peer merchants.

13. The apparatus as defined in claim 11, wherein the processor further issues instructions to:
 generate from the accumulated data:
  a total of funds transferred for the first merchant for a current time period as compared with a past time period; and
  a total of funds transferred for the peer merchants for the current time period as compared with the past time period.

14. The apparatus as defined in claim 11, wherein the processor further issues instructions to:
 calculate, from the accumulated data, for each of the plurality of accounts for a current time period and a past time period, the number of transactions on each of the accounts for:
  the first merchant and the percentage change thereof for the current time period and the past time period; and
  the peer merchants and the percentage change thereof for the current time period and the past time period, wherein the report further includes:
   the percentage change for the first merchant within the current time period as compared with the past time period; and
   the percentage change for the peer merchants within the current time period as compared with the past time period.

15. The apparatus as defined in claim 11, wherein the each said account is issued by the corresponding said issuer as a type selected from the group consisting of:
 a prepaid account;
 a credit account;
 a debit account;
 a corporate account;
 a non-corporate account;
 a Flexible Savings Account;
 a Health Savings Account;
 a small business account; and
 a government account.

16. A computer implemented method comprising:
 processing via a transaction processor handler a first transaction on an account issued to a first consumer by a first issuer, for a first merchant, the first merchant submitting the first transaction to a first acquirer, the first acquirer submitting the first transaction to the transaction processor handler;
 processing via the transaction processor handler a second transaction on an account issued to a second consumer by a second issuer, for a second merchant, wherein the second merchant is identified as a peer merchant in a similar line of business as the first merchant, the second merchant submitting the second transaction to a second acquirer, the second acquirer submitting the second transaction to the transaction processor handler;
 requesting, via the transaction processor handler, payment for the first transaction, wherein requesting including requesting from the first issuer of the corresponding account for the first transaction payment for the first transaction;
 requesting, via the transaction processor handler, payment for the second transaction, wherein requesting includes requesting from the second issuer of the corresponding account for the second transaction payment for the second transaction;
accumulating data from a plurality of first and second transactions;
processing the accumulated data to assign a particular one of a plurality of distinct designations to each of a plurality of customer accounts, wherein a first of the distinct designations is a new customer designation and a second of the distinct designations is a lost to competitor designation;
calculating from the accumulated data, via a computer:
  a frequency of use of each of the accounts used in transactions with the first merchant and a plurality of merchants that are peers to the first merchant;
  a percentage difference in overall sales between the first merchant and the peer merchants, wherein the difference is calculated by comparing overall sales for at least two pairs of adjacent time periods;
  a percentage change in transaction data for new customer accounts and lost to competitor accounts of the first merchant; and
  a percentage change in transactions of transaction data for new customer accounts and lost to competitor accounts of the peer merchants;
generating a report including:
  the frequency of use;
  the percentage difference in overall sales;
  the percentage change in transaction data for the new customer accounts and the lost to competitor accounts of the first merchant; and
  the percentage change in transaction data for the new customer accounts and the lost to competitor accounts of the peer merchants; and
processing the accumulated data to generate:
  purchase frequency and purchase recency metrics for accounts of the first merchant and the peer merchants having an existing customer designation;
  customer count growth and attracting competitor customers metrics for accounts of the first merchant and the peer merchants having the new customer designation;
  lost customers metrics for accounts of the first merchant and the peer merchants having a lost customer designation; and
  customers lost to competitors metrics for accounts of the first merchant and the peer merchants having the lost to competitor customer designation.

* * * * *